(12) United States Patent
Sulser et al.

(10) Patent No.: US 8,273,814 B2
(45) Date of Patent: Sep. 25, 2012

(54) EMULSIFYING POLYMERS AND THEIR USE

(75) Inventors: Ueli Sulser, Unterengstringen (CH); Anna Krapf, Hirzel (CH); Ulf Velten, Oberengstringen (CH)

(73) Assignee: Sika Technology AG, Baar (CH)

( * ) Notice: Subject to any disclaimer, the term of this patent is extended or adjusted under 35 U.S.C. 154(b) by 320 days.

(21) Appl. No.: 12/451,977

(22) PCT Filed: Jul. 31, 2008

(86) PCT No.: PCT/EP2008/060032
§ 371 (c)(1),
(2), (4) Date: Mar. 22, 2010

(87) PCT Pub. No.: WO2009/016213
PCT Pub. Date: Feb. 5, 2009

(65) Prior Publication Data
US 2010/0197840 A1    Aug. 5, 2010

(30) Foreign Application Priority Data
Jul. 31, 2007    (EP) ..................... 07113540

(51) Int. Cl.
*C08G 61/12*    (2006.01)

(52) U.S. Cl. ......... 524/332; 524/145; 524/337; 524/315; 524/300; 524/559; 524/556; 526/318.2; 526/318.4

(58) Field of Classification Search ............ 524/332
See application file for complete search history.

(56) References Cited

U.S. PATENT DOCUMENTS
6,569,924 B2    5/2003    Shendy et al.

FOREIGN PATENT DOCUMENTS

| | | |
|---|---|---|
| EP | 0 056 627 B1 | 10/1984 |
| EP | 0 667 371 A2 | 8/1995 |
| EP | 1 136 508 A1 | 9/2001 |
| EP | 1 138 697 A1 | 10/2001 |
| EP | 1 348 729 A1 | 10/2003 |
| EP | 0 840 712 B1 | 3/2004 |
| WO | WO 00/17128 A1 | 3/2000 |
| WO | WO 2004/056445 A1 | 7/2004 |

OTHER PUBLICATIONS

Search Report issued for International Application No. PCT/EP2008/060032 on Dec. 12, 2008.

*Primary Examiner* — Doris Lee
(74) *Attorney, Agent, or Firm* — Oliff & Berridge, PLC

(57) ABSTRACT

The present invention relates to emulsifying polymers, in particular to the use of these polymers for the stable emulsification of hydrophobic additives in aqueous concrete plasticizers.

23 Claims, No Drawings

EMULSIFYING POLYMERS AND THEIR USE

FIELD OF THE INVENTION

The present invention relates to emulsifying polymers, in particular to the use of these polymers for the stable emulsification of hydrophobic admixtures in aqueous concrete plasticizers.

PRIOR ART

Polymers of α,β-unsaturated carboxylic acids having polyalkylene glycol side chains have been used for a relatively long time as plasticizers in concrete technology owing to their pronounced water reduction. These polymers have a comb polymer structure and, on incorporation, can introduce considerable amounts of air into mineral construction materials, so that cavities are formed owing to the air voids in the concrete, which leads to a deterioration in the mechanical properties and durability of the concrete.

In order to reduce the content of air voids in concrete in the case of the use of such plasticizers, these plasticizers are generally used together with deaerators or antifoams. Such antifoams must be poorly water-soluble to water-insoluble, i.e. hydrophobic, in order to be able to display an effective antifoam effect. Owing to the poor water solubility, phase separation occurs over time after the introduction of the antifoam into the aqueous concrete plasticizer and gives rise to problems during the end use of the product. Mixtures of plasticizers based on polycarboxylates and hydrophobic antifoams are therefore not sufficiently storage-stable. There is no long-term storage stability. The problem is currently circumvented by, for example, stirring storage tanks of a defoamed product.

WO 00/17128 describes a mixture of a plasticizer based on polycarboxylates and butoxylated polyalkylenepolyamines as a deaerator which is precipitated owing to the high pH and thus displays a defoaming effect. However, such antifoams deaerate the concrete less effectively than hydrophobic substances and must be used in higher doses, which is economically disadvantageous.

In some cases, surfactants are added for achieving stable mixtures of aqueous polymers and hydrophobic antifoams. Thus, for example, WO2004/056445A1 discloses a surfactant which has an amine function and dissolves the water-insoluble antifoam. U.S. Pat. No. 6,569,924B2 discloses surfactants based on alkoxylated, carboxylated, sulfonated or sulfated aliphatics, sorbitans, polypropylenes, fatty acids, fatty alcohols and isononanols. These as well as maleic/styrene copolymers are used for dissolving hydrophobic antifoams in aqueous, polymeric plasticizers in the form of micelles. The micelles are destroyed on addition to cements and release the antifoams. The use of surfactants for dissolving water-insoluble substances in aqueous polymer solutions entails the disadvantage that such surfactants, when used in concrete, can in principle have both a deaerating and an aerating effect, depending on the type of cement or aggregates. Defined defoaming is therefore ensured only with effort.

The known solutions for the preparation of stable mixtures of water-insoluble substances in aqueous polymer solutions for use in hydraulically setting systems are therefore still worthy of improvement. There is the need to be able to prepare stable mixtures which are storage-stable over a relative long time.

SUMMARY OF THE INVENTION

It is therefore an object of the present invention to provide a composition with which the disadvantages of the prior art are overcome and which permits the addition of hydrophobic admixtures to aqueous polymer solutions without leading to phase separation. Accordingly, long-term storage stability of hydrophobic antifoams in aqueous polymer solutions is to be achieved with the aid of the composition according to the invention.

Surprisingly, it was found that this can be achieved by a polymer P as claimed in claim 1. It has now surprisingly been found that the polymers P according to the invention are capable of emulsifying hydrophobic antifoams in aqueous polycarboxylate plasticizers in a storage-stable manner. Moreover, the polymers P according to the invention themselves lead to an additional water reduction and to improved plasticization of hydraulically setting compositions prepared therewith. Thus, the use of a polymer P according to the invention permits the preparation of a stable mixture of hydrophobic antifoam and aqueous polymer solutions, which is storage-stable over a relatively long time and which has outstanding plasticizing properties without an excessive amount of air being introduced into the hydraulically setting systems.

The invention also comprises the use of the polymers P according to the invention as plasticizers for hydraulically setting compositions and as emulsifiers for aqueous compositions. Moreover, the invention comprises an aqueous composition comprising the polymer P according to the invention, at least one antifoam M and at least one plasticizer V. Further advantageous configurations of the invention are evident from the subclaims.

PREFERRED EMBODIMENTS OF THE INVENTION

The present invention relates to a polymer P which is obtainable by copolymerization of (a) at least one ethylenically unsaturated monomer A which comprises ionic groups with (b) at least one ethylenically unsturated monomer B which has hydrophilic oxyalkylene groups and (c) at least one ethylenically unsaturated monomer C which has vinylaromatics and (d) at least one hydrophobic ethylenically unsaturated monomer D of the formula (V); and optionally (e) at least one basic ethylenically unsaturated amino compound E; and optionally with (f) at least one further monomer W polymerizable with the components (a) to (d) and optionally (e).

"Copolymerization" is understood as meaning a polymerization reaction, preferably a free radical polymerization, in which monomers are polymerized preferably in the presence of a free radical initiator. Free radical polymerization is a standard process which is very well known to the person skilled in the art. Suitable free radical initiators are, for example, inorganic or organic peroxides, such as, for example, benzoyl peroxide, or hydroperoxides, persulfates, peresters or organic azo compounds. The polymerization can also be initiated by redox initiators.

Monomer A is selected form the group consisting of unsaturated mono- or dicarboxylic acids or analogues of unsaturated mono- or dicarboxylic acids, unsaturated sulfonic acids or analogues of unsaturated sulfonic acids, and unsaturated phosphonic acids or analogues of unsaturated phosphonic acids.

Monomer A has in particular the formula (VII).

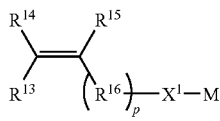

(VII)

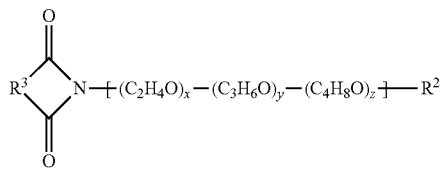

(III)

Here, $X^1$ is $CO_2$, $SO_3$ or $PO_3$, $R^{13}$ is H, $CH_3$, COOM or $CH_2COOM$, in particular H, or $R^{13}$ together with X can form a ring to give —CO—O—CO—, $R^{14}$ is H, an alkyl having 1 to 5 carbon atoms, COOM or $CH_2COOM$, in particular H, and $R^{15}$ is H, $CH_2COOM$ or an alkyl having 1 to 5 carbon atoms, in particular H or $CH_3$. $R^{16}$, independently of one another, are a phenylene group or a linear or branched alkylene group having 1 to 20 carbon atoms, which may optionally have functional groups with heteroatoms, and p has the value 0 or 1. $R^{16}$ may therefore not be present if p is 0 or may be, for example, $CH_2$ or may have an amide, amine, ester, ether or ketone group as functional groups.

M is H, alkali metal, alkaline earth metal, ammonium, ammonium cation or mixtures thereof. M may be in particular a cation, in particular $H^+$, $Na^+$, $Ca^{++}/2$, $Mg^{++}/2$, $NH_4^+$ or an organic ammonium. It is clear to the person skilled in the art that, in the case of the polyvalent ions, a further counterion must be present, which, inter alia, may also be a carboxylate thereof or another molecule of the polymer P. The ammonium compounds are in particular tetraalkylammonium or $HR_3N^+$, in which R is an alkyl group, in particular $C_1$- to $C_6$-alkyl group, preferably ethyl or butyl. Ammonium ions are obtained in particular by the neutralization of the carboxyl group with commercially available tertiary amines.

Examples of suitable monomers A are acrylic acid, methacrylic acid, mesaconic acid, citraconic acid, glutaconic acid, fumaric acid, maleic acid, maleamic acid, itaconic acid, vinylbenzoic acid, crotonic acid, vinylsulfonic acid, allylsulfonic acid, methallylsulfonic acid, 2-acrylamido-2-methylpropanesulfonic acid or vinylphosphonic acid, or derivatives or analogues thereof, such as, for example, the maleic acid hemiamide of maleic acid and sulfanilic acid, in particular N-(4-sulfophenyl)maleamide. Monocarboxylic acids are particularly preferred. Acrylic acid or methacrylic acid or analogues thereof are particularly suitable.

The analogue of the unsaturated mono- or dicarboxylic acid is, for example, an acid salt, acid halide or acid anhydride. The analogue of the unsaturated sulfonic acid or phosphonic acid is, for example, an acid salt.

The unsaturated mono- or dicarboxylic acid, sulfonic acid or phosphonic acid used according to the invention may therefore be present as free acid or as salt or partial salt, hereinbelow the term "salt" comprising not only the classical salts, as are obtained by neutralization with a base, but also complex chemical compounds between metal ions and the carboxylate or carboxyl groups as ligands.

Monomer B comprises hydrophilic oxyalkylene groups and has in particular the formula (I), (II) or (III):

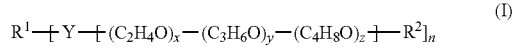

(I)

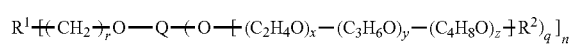

(II)

Here, $R^1$, independently of one another, are a mono- or dicarboxylic acid defined in the case of monomer A and derived in particular through the formula (VII), after removal of n carboxyl groups, where n, independently of one another, are 1 in the case of a monocarboxylic acid or 1 or 2 in the case of a dicarboxylic acid.

$R^2$, independently of one another, are H, alkyl having 1-20 carbon atoms or alkylaryl having 7-20 carbon atoms. $R^2$ is particularly preferably H. Also suitable are monomers B end-capped at one end, in which $R^2$ is alkyl having 1-20 carbon atoms, particularly methyl, or alkylaryl having 7-20 carbon atoms.

$R^3$, independently of one another, are a structural group which is derived from a dicarboxylic acid defined in the case of monomer A, after removal of both carboxyl groups, in particular are

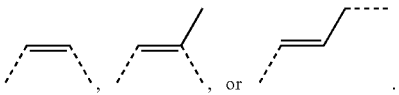

$R^4$, independently of one another, are an alkyl group having 1-20 carbon atoms, an alkylaryl group having 7-20 carbon atoms or H, preferably $R^4$=H.

Y, independently of one another, are

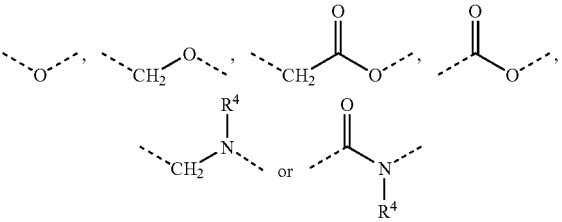

and x, y, z, independently of one another, each have the values 0-250 and x+y+z=3 or greater. Preferably, the sum x+y+z is at least 20, and particularly preferably 20-100.

r, independently of one another, have the value 0 or 1.

Q is the radical of a polyalcohol of the formula $Q(OH)_{q+1}$ after removal of all OH groups, q being from 2 to 5, in particular 2 or 3.

Examples of monomers B of the formula (I) are polyoxyalkylene monovinyl ether, in particular polyethylene glycol monovinyl ether, polyoxyalkylene monoallyl ether, polyoxyalkylene butenoic acid ester, polyoxyalkylene acrylic acid ester, polyoxyalkylene methacrylic acid ester, polyoxyalkyleneallylamine, polyoxyalkyleneacrylamide, polyoxyalkyleneallylamide or polyoxyalkylene-N-(2-hydroxyethyl)maleamide.

Particularly preferred monomers B are those of the formula (I), in which Y is —O— or —$CH_2$—O—, so-called polyoxyalkylene alkenyl ethers, in particular polyoxyalkylene allyl ether, polyoxyalkylene methallyl ether, polyoxyalkylene isopropenyl ether or polyoxyalkylene vinyl ether.

$R^1$ is in particular

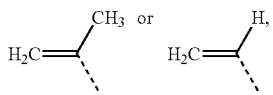

and $R^2$ is H or methyl, n is 1, x is from 0 to 100, y is from 0 to 100, z is 0, x+y being greater than 3, preferably being at least 20, and the oxyalkylene groups ($C_2H_4O$) and ($C_3H_6O$) may occur in any sequence, for example randomly, statistically, alternately or blockwise. Particularly preferably, y is 0 and x is 20-60. Thus, the monomer B is preferably a polyethylene glycol monovinyl ether or polyethylene glycol monoallyl ether. Polyethylene glycol monallyl ether is particularly preferred.

Examples of monomers B of the formula (II) are vinyl ethers or allyl ethers of alkoxylated, in particular ethoxylated alcohols. Suitable alcohols are, for example, alkyl alcohols, such as propanol, propanediol, butanol, butanediol, or glycerol, diglycerol, polyglycerol, trimethylolethane, trimethylolpropane, 1,3,5-pentanetriol, erythritol, pentaerythritol, dipentaerythritol, sorbitol, sorbitan or isosorbide. Preferred monomers B of the formula (II) are, for example, ethoxylated hydroxybutyl vinyl ethers or 3-allyloxy-1,2-propanediol.

Monomers B of the formula (III) are reaction products of dicarboxylic acids, in particular of maleic acid, fumaric acid, citraconic acid or glutaconic acid, with a polyoxyalkyleneamine to give dicarboximides. Suitable polyoxyalkyleneamines are in particular monoamines which are sold, for example, by Huntsman under the name Jeffamine® of the M series.

Monomer C is a vinylaromatic and has in particular the formula (IV):

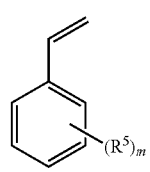

Here, the radicals $R^5$, independently of one another, are a linear or branched alkyl radical having 1-30 carbon atoms, alkoxy of the formula —$OR^6$, polyoxyalkoxy of the formula —O—[($C_2H_4O)_x$—($C_3H_6O)_y$—($C_4H_8O)_z$]-$R^2$, Cl or methyl chloride, F or methyl fluoride, Br or methyl bromide, or $NO_2$, m being a number from 0 to 5, preferably 0, $R^6$, independently of one another, are alkyl having 1-30 carbon atoms, and x, y, z, independently of one another, each have the values 0-250 and x+y+z is 3 or greater, and $R^2$, independently of one another, are H, alkyl having 1-20 carbon atoms or alkylaryl having 7-20 carbon atoms.

A suitable monomer C is, for example, styrene or alkylstyrene, for example methyl- or ethylstyrene, or oxyalkylenestyrene, vinyltoluene, vinylxylene or vinylbenzyl chloride. Styrene is particularly preferred as monomer C.

Monomer D is hydrophobic, i.e. water-insoluble, and preferably has at least one structural group with an affinity for nonpolar substances. Monomer D has in particular the formula (V):

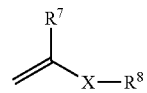

Here, $R^7$ is H or methyl and $R^8$ is a linear or branched alkyl radical having 2-30 carbon atoms, cycloalkyl, alkenyl, alkylaryl or aralkyl having 7-20 carbon atoms, a substituted or unsubstituted aryl radical or a divalent radical having 2 to 30 carbon atoms, $R^8$, if X is

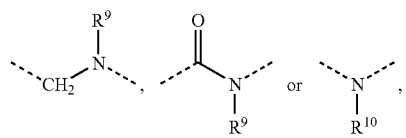

optionally forming a ring with $R^9$ or $R^{10}$ and with N, in particular a 5-membered to 8-membered ring, which optionally has aromatic structures and optionally has heteroatoms in or on the ring.

X is

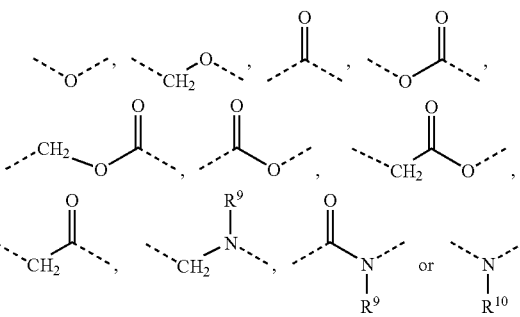

$R^9$ is alkyl having 1-20 carbon atoms, alkylaryl having 7-20 carbon atoms or H, preferably $R^9$=H, $R^9$ optionally forming a ring with N and with $R^8$, in particular a 5-membered to 8-membered ring, and optionally having heteroatoms in or on the ring.

$R^{10}$ is alkyl having 1-20 carbon atoms, alkylaryl having 7-20 carbon atoms or alkenyl having 1 to 20 carbon atoms, $R^{10}$ optionally forming a ring with N and with $R^8$, in particular a 5-membered to 8-membered ring, and optionally having heteroatoms in or on the ring.

Preferably, $R^7$ is H, X is

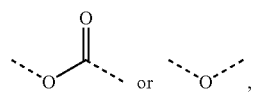

and $R^8$ is a branched or linear alkyl radical having 3 to 20 carbon atoms.

Vinaqyl ethers or allyl ethers, such as, for example, butyl vinyl ether, isobutyl vinyl ether, allyl propyl ether, allyl butyl ether or allyl phenyl ether, are particularly suitable.

Vinyl esters or allyl esters of fatty acids, for example vinyl propionate, vinyl butyrate, allyl propionate, allyl butyrate or vinyl laurate, are very particularly preferred. Particularly suitable is the vinyl ester of fatty acids, in particular of a Versatic® acid 9, which is obtainable, for example, under the name VeoVa 9™ from Shell. Suitable fatty acids which can be esterified are, for example, carboxylic acids having 3 to 30 carbon atoms, in particular propionic acid, butyric acid, valeric acid, lauric acid, palmitic acid or stearic acid.

Further examples of monomers D are esters of acrylic acid, such as, for example, butyl acrylate, isobutyl acrylate, 2-ethylhexyl acrylate or lauryl acrylate. Also suitable are esters of butenoic acid, such as, for example, tert-butyl 3-butenoate.

For example, vinyl pivalate, vinyl (2)-ethylhexanoate, vinyl versatate, vinyl benzoate, N-allylmethylbenzylamine, phenylacrylamide or alkylvinylamides are also suitable as monomer D.

Only those monomers which introduce hydrophobic or water-insoluble groups into the polymer structure are particularly preferably selected as monomers D. Particularly preferred monomers D are therefore those which have a branched or linear alkyl radical having at least 3, preferably at least 4, carbon atoms as $R^8$. Suitable "hydrophobic monomers" are preferably those monomers which form water-insoluble homopolymers as homopolymers.

It has surprisingly been found that in particular the monomer D contributes to the outstanding emulsifying effect of the polymer P. If a polymer is prepared without the monomer D, the polymer foams in the preparation to a much greater extent than if the monomer D is additionally used for the preparation of the polymer P.

Optionally, the polymer P additionally contains at least one basic ethylenically unsaturated monomer E of the formula (VI)

(VI)

$R^{11}$ is H or methyl, $Y^1$ is

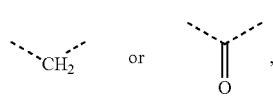

and $R^{12}$ is a radical having at least one primary, secondary or tertiary amino group if $Y^1$ is

and is a radical having at least one secondary or tertiary amino group if $Y^1$ is

Preferably, $Y^1$ is —$CH_2$—. $R^{12}$ is, for example, an amino group or a branched or straight-chain alkyleneamino group which optionally has heteroatoms, for example a polyether amino group. For example, the monomer E may be allylamine or N-methylacrylamide.

Further examples of possible monomers E are reaction products of allyl glycidyl ether with ammonia or with at least one amine. The amine can be selected, for example, from the group consisting of ethanolamine, diethanolamine, alkylamine, analine, Jeffamin® (as sold, for example, by Huntsman GmbH, Hamburg, under the name Jeffamine® of the M series), an amino acid or an alkyldiamine, for example butyldiamine. Reaction products of allyl glycidyl ether and ethanolamine or sulfanilic acid are particularly preferred.

The amino group may be present in the protonated or in the deprotonated form.

A particularly preferred example of the monomer E is allylamine.

The further monomer W may be any desired ethylenically unsaturated monomer which is polymerizable with the monomers A, B, C, D and E. For example, the monomer W may be a further amide or ester monomer. For example, the monomer W may be an ester monomer which is prepared, for example, by reacting a mono- or dicarboxylic acid with an alkyl alcohol, in particular a $C_6$-$C_{20}$ alkyl alcohol.

For the preparation of the polymer P, a combination of different monomers A, B, C and D and optionally E and/or W can be used in different amounts. For example, a plurality of monomers A can be used as a mixture, for example a mixture of maleic acid monomers with acrylic acid monomers. Alternatively, a plurality of monomers B can be used together, for example polyoxyalkylene allyl ether with polyoxyalkylene (meth)acrylic acid ester. Likewise, different substituted styrenes can be used or different monomers D can be employed.

The polymer P is preferably obtained by a free radical polymerization according to customary processes. It can be effected in a solvent, for example in toluene, benzene, water or a mixture thereof, preferably in water, or in the absence of a solvent. The reaction of the monomers to give a polymer P is preferably effected at a temperature of up to 100° C. A gas stream can be passed over or through the reaction mixture. A noble gas or nitrogen can be used as the gas stream.

The polymerization is advantageously effected under conditions such that the polymer formed is composed of from 10 to 500, preferably from 20 to 200, in particular from 25 to 60, monomer building blocks. The polymer P preferably has a molecular weight $M_w$ of from 2000 to 200 000 g/mol, preferably from 5000 to 100 000 g/mol, preferably from 8000 to 80 000 g/mol, particularly preferably from 10 000 to 50 000 g/mol.

"Molecular weight" is understood in the context of the invention as meaning the weight average molecular weight $M_w$.

Chain-transfer agents, such as, for example, inorganic or organic sulfur compounds, aldehydes, formic acid or inorganic phosphorus compounds, can be used for regulating the molecular weights.

In the preparation of the polymer P, the preferably used amount of the monomers A is 5-90 mol %, preferably 30-70 mol %, particularly preferably 55-65 mol %, that of B is 8-40 mol %, preferably 10-20 mol %, particularly preferably 12-18 mol %, that of C is 0.1-30 mol %, preferably 10-20 mol %, particularly preferably 12-18 mol %, that of D is 0.1-30 mol %, preferably 6-10 mol %, particularly preferably 7-9 mol %, that of E is 0-10 mol %, preferably 0-7 mol %, particularly preferably 0.1-2 mol %, and that of W is 0-5 mol %, preferably 0-1 mol %, particularly preferably 0-0.1 mol %, based in each case on the total molar amount of monomers of A, B, C, D, E and W used.

The molar ratio of the monomers A:B is preferably ≦10:1, preferably ≦8:1, in particular ≦3:1.

A particularly preferred polymer P is obtainable by the copolymerization reaction of acrylic acid or methacrylic acid and optionally maleic acid as monomer A with polyethylene glycol vinyl ether or polyethylene glycol allyl ether as monomer B, styrene as monomer C, a vinyl ester of a $C_4$ to $C_{20}$ fatty acid, in particular VeoVa 9™, as monomer D and optionally allylamine as monomer E.

A preferred polymer P has the formula (VIII).

The letters a, b, b', b'', b''', b'''', c, d and e denote structural units, structural unit a forming by polymerization of the monomer A, structural unit b, b', b'', b''' or b'''' forming by polymerization of the monomer B, structural unit c forming by polymerization of the monomer C, structural unit d forming by polymerization of the monomer D, structural unit e forming by polymerization of the monomer E with the respective other monomers.

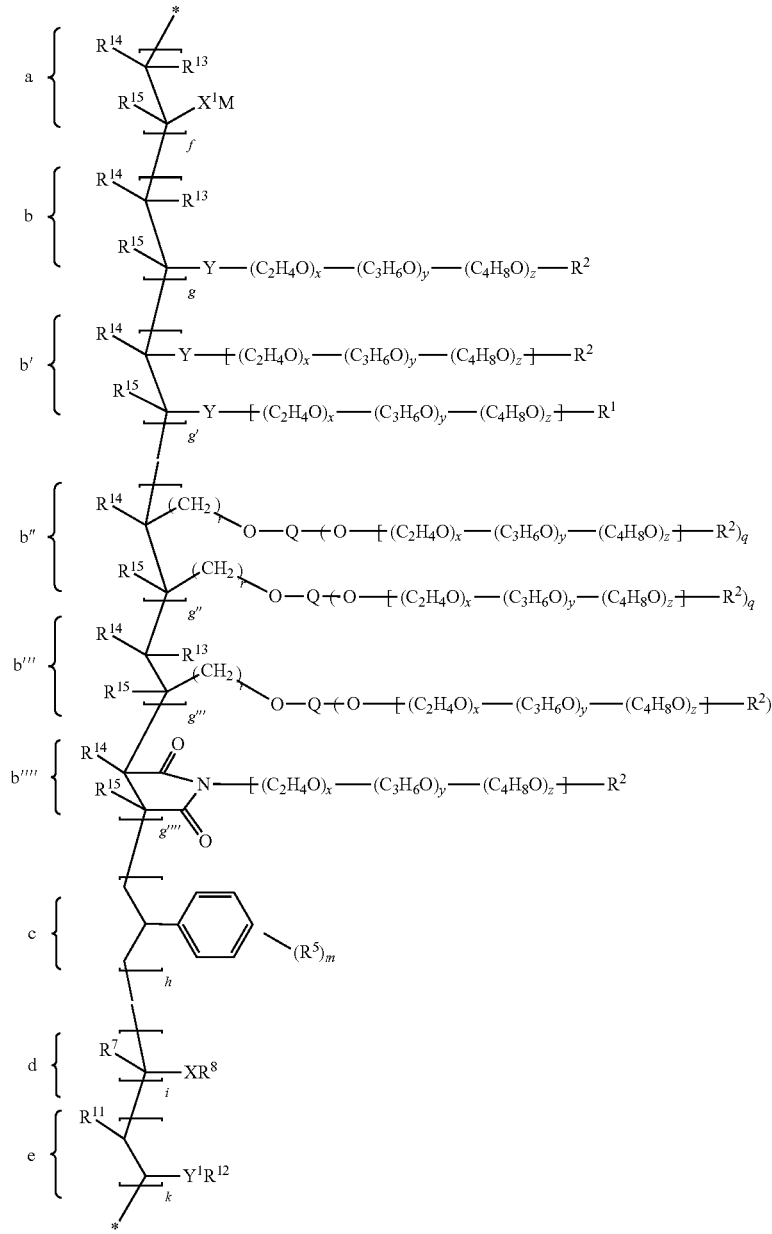

(VIII)

The substituents $R^2$, $R^3$, $R^4$, $R^5$, $R^6$, $R^7$, $R^8$, $R^9$, $R^{10}$, $R^{11}$, $R^{12}$, Q, X, $X^1$, Y, $Y^1$ and the indices n, q, r, x, y and z, independently of one another, have in each case the same meaning as have already been described for the monomers A, B, C, D and E.

The indices f, g, g', g'', g''', g'''', h, i, k denote numbers and the sum f+g+g'+g''+g'''+g''''+h+i+k is 10 to 500, where f>0, (g+g'+g''+g'''+g'''')>0, h>0, i>0 and k≧0.

The sequence of the structural building blocks a, b, b', b'', b''', b'''', c, d and optionally e may be alternate, statistical, blockwise or random.

Polymer P preferably has 5-90 mol % of structural units a, 8-40 mol % of structural units b+b'+b''+b'''+b'''', 0.1-30 mol % of structural units c, 0.1-30 mol % of structural units d and 0-10 mol % of structural units e, based in each case on the total molar amount of the structural units of a, (b+b'+b''+b'''+ b''', c, d and e of the polymer P. The molar ratio of a:(b+b'+b''+b'''+b'''') is preferably ≦10:1.

The polymer P may have a combination of different structural units of the respective structural units of a, b, c, d and optionally e. For example, a plurality of structural units a may occur as a mixture in the polymer P, for example a mixture of maleic acid units with acrylic acid units. Alternatively, a plurality of different structural units b, b', b'', b''', b'''' or different structural units of the respective units b, b', b'', b''', b'''' as a mixture may occur in the polymer P. It is also possible for a plurality of styrene units c to be present in the polymer P, in which units, for example, the styrene is differently substituted. Likewise, different hydrophobic structural units d may occur together in the polymer P, for example a vinyl ether with a vinyl ester of a fatty acid.

The different structural units may be present in any desired sequence, for example randomly, alternately or blockwise, in the polymer P.

Depending on the amount and type of monomers used, different properties of the end product can be achieved. It is therefore a further advantage of the polymer P according to the invention that a plurality of different tailor-made polymers P can be prepared simply and cost-efficiently by using different monomers or different amounts of the monomers. This has major logistical and economic advantages.

The polymer P is used in different areas, in particular in concrete and cement technology.

Owing to their structure, which comprises hydrophilic as well as hydrophobic structural units, the polymers P according to the invention are particularly suitable for use as an emulsifier for aqueous compositions, in particular for oil-in-water emulsions. The present invention therefore relates to the use of the polymer P according to the invention as an emulsifier for aqueous compositions, in particular for admixtures for hydraulically setting systems. For example, the polymer P according to the invention is outstandingly suitable for emulsifying aqueous plaster or concrete plasticizers and hydrophobic antifoams.

In addition, the present invention relates to a composition Z comprising at least one polymer P according to the invention and at least one antifoam M. Particularly suitable antifoams M are phosphoric acid esters, such as, for example, tributyl phosphate or triisobutyl phosphate (TIBP), polyalkylene glycols, such as, for example, polypropylene oxides, block copolymers containing ethylene oxide, propylene oxides or butylene oxides, mineral oils or vegetable oils, fatty acid, fatty acid esters, fatty alcohols, alkoxylated fatty acids or fatty alcohols, silicones, silicone esters or a hydrophobic organic compound.

Typically, the proportion of the polymer P in a composition Z comprising at least one polymer P and at least one antifoam M is from 20 to 80% by weight, in particular from 30 to 49% by weight, and the proportion of the antifoam M is preferably from 0.1 to 20% by weight, in particular from 0.5 to 10% by weight, based on the weight of the composition Z. The ratio of the polymer P to the antifoam M in the aqueous composition Z is preferably from 2:3 to 49:1, in particular from 3:2 to 10:1. Preferably, the composition Z additionally contains water.

In a further embodiment, the present invention relates to an aqueous composition Z comprising water, at least one polymer P according to the invention, at least one antifoam M and at least one plasticizer V for hydraulically setting compositions. Preferred plasticizers V are polycarboxylate plasticizers, as are known, for example, as high-performance plasticizers in concrete chemistry. Such polycarboxylate plasticizers are described, for example, in EP 0 056 627 B1, EP 0 840 712 B1, EP 1 136 508 A1, EP 1 138 697 B1 or EP 1 348 729 A1. Particularly preferred plasticizers are those which are prepared by a polymer-analogous reaction, as described, for example, in EP 1 138 697 B1 or EP 1 348 729 A1. Ligninsulfonates, sulfonated melamine- or naphthalene-formaldehyde condensates, vinylic copolymers or mixtures thereof can likewise be used as plasticizers V. In general, all compositions which are suitable for plasticizing hydraulically setting compositions can be used. However, aqueous polymer mixtures of carboxylate plasticizers are particularly suitable.

For the preparation of the composition Z, in particular of an aqueous composition Z comprising the polymer P according to the invention, at least one polymer P according to the invention is mixed with the antifoam M and optionally the plasticizer V. Preferably, first the polymer P, preferably as an aqueous emulsion, is premixed with the antifoam M and then an aqueous solution of the plasticizer V is optionally added. By mixing the polymer P according to the invention together with the antifoam M and the plasticizer V in water, a stable aqueous polymer mixture Z without phase separation is obtained, which polymer mixture is storage-stable over several months.

The aqueous composition Z can, if desired, be converted into powder form before use, for example by spray drying, with the aid of protective colloids or other drying auxiliaries. In powder form, the aqueous mixture Z can be stored or can be added to a dry blend containing at least one hydraulically setting substance. The dry blend is storage-stable over a relatively long time and is typically packed in bags or stored in bins.

The polymer P and optionally the antifoam M can also first be prepared as such and then added to a plasticizer V which is present as a polymer melt. If the polymer melt comprising the plasticizer V, and the added polymer P and the antifoam M is cooled, a composition in solid form is obtained, in particular scales, flakes, pellets or sheets. This solid polymer composition can be stored and can be dissolved in water before use, with the result that the aqueous composition Z according to the invention forms.

Typically, the proportion of the polymer P in a composition comprising water, at least one polymer P, at least one antifoam M and at least one plasticizer V is from 0.04 to 10% by weight, in particular from 0.05 to 5% by weight, based on the weight of the aqueous composition Z.

The ratio of the polymer P to the antifoam M in the aqueous composition Z is preferably from 2:3 to 10:1, in particular from 3:2 to 3:1. If the aqueous composition Z contains at least one plasticizer V, the proportion of the plasticizer V is preferably from 3 to 50% by weight, in particular from 20 to 40% by weight, based on the weight of the aqueous composition Z.

The aqueous composition Z may contain further constituents. Examples of these are solvents or additives, as are familiar in construction chemistry, in particular surface-active substances, heat and light stabilizers, dyes, accelerators, retardants, foam formers.

The polymer P acquires the hydrophilic effect in particular through the use of the polyoxyalkylene groups of the monomer B in the preparation of the polymer P.

The hydrophobic effect is achieved through the use of the hydrophobic monomers C and D. It is therefore particularly advantageous that, in addition to the hydrophobic monomer C, those monomers D which introduce hydrophobic or poorly water-soluble or water-repellent groups into the polymer structure are also chosen. By the addition of the monomers D, the emulsifying effect according to the invention is achieved.

Since the polymer P itself displays a plasticizing effect too, it can also be used as a plasticizer for hydraulically setting compositions. In a further aspect, the invention therefore relates to the use of the polymer P according to the invention as the plasticizer for hydraulically setting compositions, in particular for concrete and mortar.

Since the polymer P can act simultaneously as an emulsifier and as an additional plasticizer, it can enhance the effect of the actual plaster plasticizer or concrete plasticizer in the plaster or concrete and lead to outstanding mechanical properties in the plaster or concrete.

The polymer P is preferably used in an amount of from 0.005 to 5% by weight polymer content or solid, based on the weight of the hydraulic binder. A plurality of polymers P may also be used as a mixture in order to achieve the desired effect.

In principle, all hydraulically setting substances known to the person skilled in the art in the area of concrete can be used as hydraulically setting systems or compositions. These are in particular hydraulic binders, such as cements, such as, for example, Portland cements or high-alumina cements, and/or mixtures thereof with fly ashes, silica fume, slag, blast sands and limestone fillers. Further hydraulically setting substances in the context of the present invention are plaster, in the form of anhydrite, hemihydrate or dihydrate, or quicklime. Cement is preferred as the hydraulically setting composition. Furthermore, aggregates, such as sand, gravel, stones, quartz powder, chalks, and constituents customary as additives, such as other concrete plasticizers, for example lignosulfinates, sulfonated naphthalene-formaldehyde condensates, sulfonated melamine-formaldehyde condensates or polycarboxylate ethers, accelerators, corrosion inhibitors, retardants, shrinkage reducers, antifoams or air-entraining agents, are possible.

The polymer P according to the invention may be a constituent of an aqueous composition which is storage-stable over a relatively long time or it may be a constituent of a hydraulically setting composition. As a constituent of a hydraulically setting composition, the polymer P can be added to a customary hydraulically setting composition together with or shortly before or shortly after the addition of the water. The addition of the polymer P in the form of an aqueous solution or dispersion, in particular as mixing water or as part of the mixing water, has been found to be particularly suitable here.

The polymer P has a plasticizer property for hydraulically setting compositions, in particular cementitious compositions, i.e. in the case of water/cement (w/c) ratios customary in cement and concrete technology, the resulting mixture has substantially greater flow behavior compared with a composition without the plasticizer. The flow behavior is typically measured via the slump. On the other hand, it is possible to obtain mixtures which require significantly less water for the same flow behavior, so that the mechanical properties of the hardened hydraulically setting composition are greatly enhanced. A specific use is the simultaneous use of the polymer P as an emulsifier in the preparation of the polymer mixture which contains the actual plasticizer V and the use as an additional plasticizer which enhances the effect of the actual plasticizer V.

EXAMPLES 1.1 Abbreviations Used

TABLE 1

| Abbreviation | Meaning | Mw* | Manufacturer |
|---|---|---|---|
| Allyl-PEG1100 | Polyethylene glycol allyl ether | 1100 g/mol | Clariant |
| Allyl-PEG2000 | Polyethylene glycol allyl ether | 2000 g/mol | Clariant |

TABLE 1-continued

| Abbreviation | Meaning | Mw* | Manufacturer |
|---|---|---|---|
| Vinyl-PEG1000 | Polyethylene glycol vinyl ether | 1000 g/mol | Clariant |
| VEOVA ® 9 | Vinyl ester from Versatic ® acid 9 | | Christ Chemie AG |

*Mw = average molecular weight 1.2. Preparation Method a for Polymers P8 to P10

In a reaction vessel having an anchor stirrer (IKA® stirrer), temperature probe, reflux condenser and two separate feed nozzles, approximately equal amounts of water and allyl-PEG (obtainable from Clariant, Basel, Switzerland) and styrene (obtainable from Fluka, Switzerland) and VEOVA®9 (obtainable from Christ Chemie AG, Switzerland) are initially introduced in an amount stated in table 2 and brought to 85° C. As soon as 85° C. was reached, 0.1 g of sodium hypophosphite (obtainable from Fluka, Switzerland) was added. Thereafter, acrylic acid and optionally maleic acid (both obtainable from Fluka, Switzerland) were metered in simultaneously via the first feed and 20 g of 10% strength sodium persulfate solution (obtainable from Fluka, Switzerland) via the second feed in a period of 2 hours. The temperature was kept at 85° C.-95° C. After everything had been metered in, postpolymerization was effected for a further hour at 90° C. Thereafter, dilution to the desired solids content of the polymer of 40% by weight, based on the total weight of the polymer solution, was effected with the corresponding amount of water.

1.3. Preparation Method B for Polymers P1 to P7

In a reaction vessel having an anchor stirrer (1 KAO stirrer), temperature probe, reflux condenser and two separate feed nozzles, approximately equal amounts of water and allyl-PEG or vinyl-PEG (obtainable from Clariant, Basel, Switzerland) and optionally allylamine (obtainable from Fluka, Switzerland) were initially introduced in an amount stated in table 2 and cooled to 22° C. Thereafter, styrene (obtainable from Fluka, Switzerland), VEOVA®9 (obtainable from Christ Chemie AG, Switzerland) and maleic acid or itaconic acid were added. If a vinyl ether is used instead of an allyl-PEG, the pH is increased to pH 5.5 by means of sodium hydroxide solution. A little $Fe(II)SO_4$ (0.1 g) was added and the acrylic acid or the salt of acrylic acid was then transferred to the initially introduced mixture.

With stirring, a 15% strength solution of 10 g of Rongalit™C (obtainable from BASF, Germany) in water is now added dropwise to the initially introduced mixture via the first feed and a 35% strength solution of 21 g of hydrogen peroxide (obtainable from Fluka, Switzerland) in water via the second feed, the temperature increasing from 22° C. to 55° C. The Rongalit™C solution was added dropwise via the first feed in 25 minutes and the hydrogen peroxide solution via the second feed in 35 minutes. Finally, the emulsion was diluted with water to the desired polymer content of 40% by weight, based on the total weight of the polymer solution.

TABLE 2

Polymers P according to the invention (P-1 to P-10). The amounts are stated in moles.

| No. | Monomer A | | | Monomer B | | | Monomer C Styrene | Monomer D VEOVA ® 9 | Monomer E Allyl-amine | Preparation process |
| | Acrylic acid | Maleic acid | Itaconic acid | Allyl-PEG-1100 | Allyl-PEG-2000 | Vinyl-PEG-1000 | | | | |
|---|---|---|---|---|---|---|---|---|---|---|
| P-1 | 1.2 | 0.3 | | 0.4 | | | 0.415 | 0.215 | | B |
| P-2 | 1.2 | 0.388 | | 0.4 | | | 0.392 | 0.215 | | B |
| P-3 | 1.2 | 0.491 | | 0.4 | | | 0.415 | 0.199 | | B |
| P-4 | 1.2 | 0.388 | | | | 0.4 | 0.415 | 0.215 | | B |
| P-5 | 1.2 Na salt 1.36 | 0.2 | | 0.4 | | | 0.415 | 0.215 | 11.4 | B |
| P-6 | 2 | | | | 0.5 | | 0.49 | 0.268 | | B |
| P-7 | 1.2 | | 0.2 | 0.4 | | | 0.415 | 0.215 | | B |
| P-8 | 2 | | | | 0.5 | | 0.49 | 0.268 | | A |
| P-9 | 1.2 | | | | 0.3 | | 0.294 | 0.16 | | A |
| P-10 | 1.2 | 0.142 | | | 0.3 | | 0.309 | 0.16 | | A |

2. Preparation of Aqueous Compositions Z

For the preparation of an aqueous composition Z according to the invention, first a 40% strength aqueous emulsion of the polymer P according to the invention was prepared. For this purpose, 40% by weight of a polymer P according to table 2 was mixed with 60% by weight of water. An antifoam M was mixed into the 40% strength aqueous polymer emulsion and, depending on the experiment, this mixture was added to or shaken into a 30% strength aqueous solution of a plasticizer V, in the amount stated in table 3, with stirring. The 30% strength aqueous solution of the plasticizer V was prepared by mixing 30% by weight of a plasticizer V with 70% by weight of water.

A polymer which was prepared according to the polymer-analogous reaction and which was described in WO2005/123621A1 in table 2 as polymer A4 was used as plasticizer V. Pronal® 735 S (obtainable from Toho Chemical Industry Co., Ltd), was used as antifoam M-1, polypropylene glycol having an average molecular weight $M_w$ of 1200 g/mol (obtainable from Fluka, Switzerland) was used as M-2, triisobutyl phosphate (obtainable from Fluka, Switzerland) was used as M-3 and Pluronic® PE 3100 (obtainable from BASF, Germany) was used as M-4.

In the case of the composition Z-21, a conventional surfactant Texapon NSO from Cognis GmbH (Monheim, Germany) was used as comparison, instead of the emulsifying polymer P. For this purpose, 1.75% by weight of the commercial product Texapon NSO was used and not a 40% strength emulsion.

TABLE 3

Stability of aqueous compositions Z-1 to Z-23; the amount of the plasticizer V is stated as a 30% strength aqueous solution, that of the polymer P as a 40% strength aqueous emulsion and that of the antifoam M as 100% strength liquid. The stated percentages in table 3 are % by weight, based on the total weight of the aqueous composition Z. An exception is Texapon NSO in Z-21, of which 1.75% by weight of the commercial product was used and not a 40% strength aqueous emulsion thereof.

| Composition Z | Plasticizer V (as 30% strength solution) | Polymer P (as 40% strength emulsion) | Antifoam M | Stability (storage at 20° C. after 30 days) |
|---|---|---|---|---|
| Z-1 | 98.45% | 1.25% P-1 | 0.3% M-1 | stable |
| Z-2 | 98.45% | 1.25% P-2 | 0.3% M-1 | stable |
| Z-3 | 98.45% | 1.25% P-3 | 0.3% M-1 | stable |
| Z-4 | 98.45% | 1.25% P-4 | 0.3% M-1 | stable |
| Z-5 | 98.45% | 1.25% P-5 | 0.3% M-1 | stable |
| Z-6 | 98.45% | 1.25% P-6 | 0.3% M-1 | stable |
| Z-7 | 98.45% | 1.25% P-7 | 0.3% M-1 | stable |
| Z-8 | 98.45% | 1.25% P-8 | 0.3% M-1 | stable |
| Z-9 | 98.45% | 1.25% P-9 | 0.3% M-1 | stable |
| Z-10 | 98.45% | 1.25% P-10 | 0.3% M-1 | stable |
| Z-11 | 98.45% | 1.25% P-6 | 0.2% M-1 0.1% M-4 | stable |
| Z-12 | 98.35% | 1.25% P-6 | 0.2% M-1 0.2% M-4 | stable |
| Z-13 | 98.25% | 1.25% P-6 | 0.2% M-1 0.3% M-4 | stable |
| Z-14 | 97.9% | 1.5% P-6 | 0.2% M-1 0.4% M-4 | stable |
| Z-15 | 98.5% | 1.25% P-1 | 0.25% M-3 | stable |
| Z-16 | 96.95% | 2.5% P-1 | 0.15% M-1 0.4% M-2 | stable |
| Z-17 | 95.45% | 3.75% P-1 | 0.3% M-1 0.6% M-2 | stable |
| Z-18 | 97.02% | 2.5% P-3 | 0.38% M-1 0.1% M-3 | stable |
| Z-19 | 94.12% | 5% P-4 | 0.88% M-1 | stable |
| Z-20 | 100.00% | | | stable |
| Z-21 | 97.95% | 1.75% Texapon NSO | 0.3% M-1 | Separation |
| Z-22 | none | 80.0% P-4 | 20.0% M-1 | stable |
| Z-23 | 99.7 | none | 0.3 | Separation |

Table 3 shows that the polymer P has outstanding properties as an emulsifier and leads to stable aqueous emulsions of a mixture of plasticizer and antifoam. In contrast, a mixture of plasticizer and antifoam without the emulsifer according to the invention is not stable (cf. composition Z-23). A conventional surfactant (for example Texapon NSO from Cognis GmbH) is not any more capable of emulsifying a mixture of plasticizer and antifoam, and phase separation occurs (cf. composition Z-21).

3. Determination of the Air Content in Fresh Mortar

The efficiency of the aqueous compositions Z according to the invention was tested in fresh mortar.

| Composition of the mortar mix (MM): (Largest particle 8 mm) | Amount |
|---|---|
| Cement (Swiss CEM I 42.5) | 750 g |
| Limestone filler | 141 g |
| Sand 0-8 mm | 3150 g |
| Water | 440 g |
| Aqueous composition Z according to table 3 | 5.3 g |

The sands, the filler and the cement were dry-blended for 1 minute in a Hobart mixer. The mixing water in which the aqueous composition Z was dissolved was added in the course of 30 seconds and mixed for a further 2.5 minutes. The total wet mixing time is 2.5 minutes. The aqueous compositions Z were kept in bottles and stored for 30 days at room temperature. Thereafter, the amount of sample used (5.3 g) was taken from the bottom of the bottle by means of a pipette.

The air content of the mortar was determined using an air content tester according to EN 1015-7. If the air content was measured only after 30 minutes, the mortar mix was mixed for 10 seconds in the Hobart mixer prior to the measurement

TABLE 4

Air void content in fresh mortar in %, measured after 3 minutes and after 30 minutes.

| Mortar mix MM | Composition Z according to table 3 | Air content in mortar in % after 3 minutes | Air content in mortar in % after 30 minutes with mixing for 10 seconds |
|---|---|---|---|
| MM-1 | Z-1 | 2.8 | 3.0 |
| MM-2 | Z-2 | 2.6 | 3.1 |
| MM-3 | Z-3 | 2.6 | 2.8 |
| MM-4 | Z-4 | 2.7 | 3.3 |
| MM-5 | Z-5 | 2.9 | 3.5 |
| MM-6 | Z-6 | 3.0 | 3.1 |
| MM-7 | Z-7 | 2.5 | 2.6 |
| MM-8 | Z-8 | 2.7 | 3.2 |
| MM-9 | Z-9 | 2.4 | 2.6 |
| MM-10 | Z-10 | 2.5 | 2.9 |
| MM-11 | Z-11 | 1.8 | 2.2 |
| MM-12 | Z-12 | 1.6 | 2.0 |
| MM-13 | Z-13 | 1.6 | 1.9 |
| MM-14 | Z-14 | 1.5 | 2.1 |
| MM-15 | Z-15 | 3.3 | 3.5 |
| MM-16 | Z-16 | 2.5 | 3.0 |
| MM-17 | Z-17 | 2.4 | 2.6 |
| MM-18 | Z-18 | 3.2 | 2.6 |
| MM-19 | Z-19 | 1.6 | 1.5 |
| MM-20 | Z-20 | 8.8 | 7.8 |
| MM-21 | Z-21 | 13.2 | 13.8 |
| MM-22 | Z-22 | 1.8 | 1.8 |
| MM-23 | Z-23 | 4.0 | 4.7 |

Table 4 shows that an aqueous composition comprising the polymer P according to the invention, a plasticizer V and an antifoam M leads to an improved mortar quality and the air content can be kept low both at the beginning and over a relatively long time. If no polymer P is added (cf. mortar mix MM-20) or if a conventional surfactant is added instead of the polymer P (cf. mortar mix MM-21), the air content increases considerably and the mortar quality becomes poorer.

4. Flow Behavior of the Polymers P

For investigating the effect of the polymer P on the flow behavior of a cement mix, the slump (SLU) was determined.

For the comparative experiment without polymer P and without conventional surfactant or conventional plasticizer, 100 grams of Portland cement type I CEM 42.5 were mixed with 33 grams of water (w/c value is 0.33) for one minute and then introduced into the mini-cone (internal diameter 18.5 mm at top, 37.5 mm at bottom, height 57.2 mm). The cone was carefully raised immediately after filling. The dimension of the cement cake was then determined by means of a caliper after 90 seconds.

For experiments with the polymers P-1 to P-10 according to the invention, the proportion of water was reduced by 5%, i.e. 100 grams of Portland cement type I CEM 42.5 was mixed with 31.5 grams of water (w/c value is 0.315) and 0.5 gram of a 40% strength aqueous emulsion with the polymer P according to the invention (corresponds to 0.2 gram of the polymer solid) for one minute and then introduced into the mini-cone.

For comparison, a conventional surfactant (Texapon NSO from Cognis GmbH) or a conventional plasticizer (Flube OS 39 from Giovanni Bozzetto S.P.A, Italy) was added instead of the polymer P according to the invention.

TABLE 5

| Slump (SLU) in mm after 90 seconds | |
|---|---|
| Polymer P or surfactant or plasticizer | Slump (SLU) in mm 90 seconds |
| P-1 | 101 |
| P-2 | 122 |
| P-3 | 89 |
| P-4 | 106 |
| P-5 | 143 |
| P-6 | 60 |
| P-7 | 113 |
| P-8 | 130 |
| P-9 | 105 |
| P-10 | 90 |
| Flube OS 39 | 110 |
| Texapon NSO | 40 |
| none | 40 |

Table 5 shows that the polymer P according to the invention has a plasticizing effect even without additional plasticizer and leads to a slump which is comparable with conventional plasticizers. Conventional surfactants on the other hand have no plasticizing effect.

Of course, the invention is not limited to the working examples shown and described. It is evident that the above-mentioned features of the invention can be used not only in the combination stated in each case but also in other modifications, combinations and amendments or by themselves without departing from the scope of the invention.

The invention claimed is:

1. A polymer P obtainable by copolymerization of
   a) at least one ethylenically unsaturated monomer A selected from the group consisting of unsaturated mono- or dicarboxylic acids or analogues of unsaturated mono- or dicarboxylic acids, unsaturated sulfonic acids or analogues of unsaturated sulfonic acids and unsaturated phosphonic acids or analogues of unsaturated phosphonic acids with
b) at least one ethylenically unsaturated monomer B of the formula (I), (II) or (III)

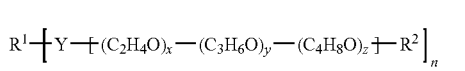 (I)

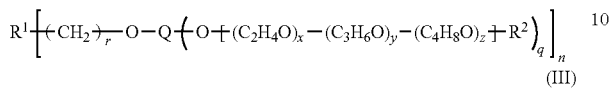 (II)

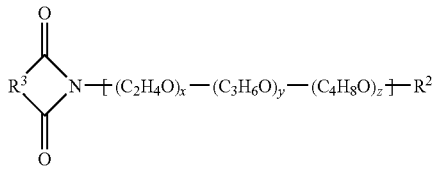 (III)

in which $R^1$, independently of one another, are mono- or dicarboxylic acids mentioned under (a), after removal of n carboxyl groups,
in which $R^2$, independently of one another, are H, alkyl having 1-20 carbon atoms or alkylaryl having 7-20 carbon atoms,
in which $R^3$ are dicarboxylic acids mentioned under (a), after removal of both carboxyl groups,
in which Y, independently of one another, are

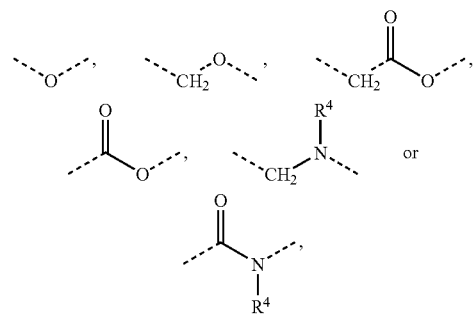

in which $R^4$, independently of one another, are alkyl having 1-20 carbon atoms, alkylaryl having 7-20 carbon atoms or H,
in which n, independently of one another, are 1 or 2,
in which r, independently of one another, have the value 0 or 1,
in which x, y, z, independently of one another, each have the values 0-250 and x+y+z is 3 or greater;
in which Q is the radical of a polyalcohol of the formula $Q(OH)_{q+1}$ after removal of all OH groups,
in which q is from 2 to 5, in particular 2 or 3,
and
c) at least one ethylenically unsaturated monomer C of the formula (IV)

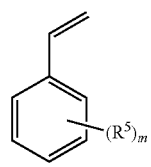 (IV)

in which $R^5$, independently of one another, are alkyl having 1-30 carbon atoms, alkoxy of the formula —$OR^6$, polyoxyalkoxy of the formula —O—[$(C_2H_4O)_x$—$(C_3H_6O)_y$—$(C_4H_8O)_z$]—$R^2$, Cl, F, Br or $NO_2$,
in which m is a number from 0 to 5,
in which $R^6$, independently of one another, are alkyl having 1-30 carbon atoms,
in which x, y, z, independently of one another, each have the values 0-250 and x+y+z is 3 or greater;
in which $R^2$, independently of one another, are H, alkyl having 1-20 carbon atoms or alkylaryl having 7-20 carbon atoms,
and
d) at least one ethylenically unsaturated monomer D of the formula (V)

 (V)

in which $R^7$ is H or methyl,
in which $R^8$ is a straight-chain or branched alkyl radical having 2-30 carbon atoms, cycloalkyl or alkenyl having 2-30 carbon atoms, alkylaryl or aralkyl having 7-20 carbon atoms, a substituted or unsubstituted aryl radical or a divalent radical having 2 to 30 carbon atoms, and in which $R^8$, if X is

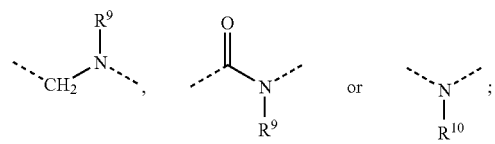

optionally forms, together with $R^9$ or $R^{10}$ and with N, a ring, in particular a 5-membered to 8-membered ring, which optionally has aromatic structures and optionally has heteroatoms in or on the ring,
in which X is

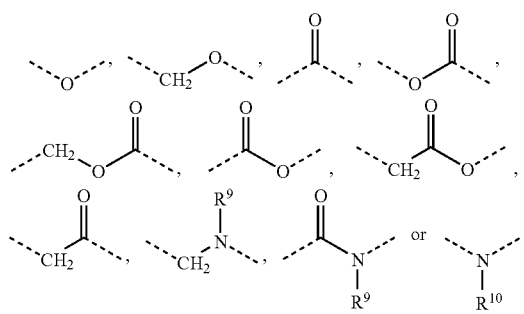

in which $R^9$ is alkyl having 1-20 carbon atoms, alkylaryl having 7-20 carbon atoms or H, and in which $R^9$ together with N and with $R^8$ optionally forms a ring, and optionally has heteroatoms in or on the ring,
in which $R^{10}$ is alkyl having 1-20 carbon atoms, alkylaryl having 7-20 carbon atoms or alkenyl having 1 to 20 carbon atoms, and in which $R^{10}$ together with N and with $R^8$ optionally forms a ring, in particular a 5-membered to 8-membered ring, and optionally has heteroatoms in or on the ring;

and optionally e) at least one basic ethylenically unsaturated monomer E of the formula (VI)

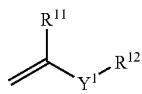
(VI)

in which $R^{11}$ is H or methyl,
in which $Y^1$ is

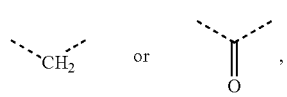

in which $R^{12}$ is a radical having at least one primary, secondary or tertiary amino group if $Y^1$ is

and is a radical having at least one secondary or tertiary amino group if $Y^1$ is

and optionally f) at least one further ethylenically unsaturated monomer W.

2. The polymer P as claimed in claim 1, wherein the monomer A has the formula (VII),

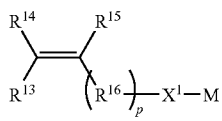
(VII)

in which $X^1$ is $CO_2$, $SO_3$ or $PO_3$,
in which M is H, alkali metal, half alkali metal, ammonium or ammonium cation,
in which $R^{13}$ is H, $CH_3$, COOM or $CH_2COOM$;
or in which $R^{13}$ together with X forms a ring to give —CO—O—CO—;
in which $R^{14}$ is H, an alkyl having 1 to 5 carbon atoms, COOM or $CH_2COOM$;
in which $R^{15}$ is H, $CH_2COOM$ or an alkyl having 1 to 5 carbon atoms;
in which $R^{16}$, independently of one another, are a phenylene group or a straight-chain or branched alkylene group having 1 to 20 carbon atoms, which optionally has functional groups with heteroatoms;
in which p has the value 0 or 1.

3. The polymer P as claimed in claim 1, wherein the analogue of the unsaturated mono- or dicarboxylic acid, sulfonic acid or phosphonic acid is selected from the group consisting of hydrochloric acid, acid halide and acid anhydride.

4. The polymer P as claimed in claim 1, wherein monomer A is (meth)acrylic acid, mesaconic acid, citraconic acid, glutaconic acid, fumaric acid, maleic acid, itaconic acid, vinylbenzoic acid, crotonic acid, vinylsulfonic acid, allylsulfonic acid, methallylsulfonic acid, 2-acrylamido-2-methyl-propanesulfonic acid or vinylphosphonic acid.

5. The polymer P as claimed in claim 1, wherein the copolymerization takes place in the presence of a free radical initiator.

6. The polymer P as claimed in claim 1, wherein the monomer B is a polyoxyalkylene (meth)acrylic acid ester or a polyoxyalkylene vinyl ether or polyoxyalkylene allyl ether.

7. The polymer P as claimed in claim 1, wherein the monomer C is styrene.

8. The polymer P as claimed in claim 1, wherein the monomer D is a vinyl ester of a fatty acid having 3 to 30 carbon atoms.

9. The polymer P as claimed in claim 1, wherein the monomer E is allylamine.

10. The polymer P as claimed in claim 1, wherein the monomer E is prepared by reacting allyl glycidyl ether with ammonia or at least one amine.

11. The polymer P as claimed in claim 1, wherein the ratio of A:B is $\leq 8:1$.

12. The polymer P as claimed in claim 1, wherein the amount of monomers A used is 5-90 mol %, that of B is 8-40 mol %, that of C is 0.1-30 mol %, that of D is 0.1-30 mol %, that of E is 0-10 mol % and that of W is 0-5 mol %, based in each case on the total molar amount of the monomers of A, B, C, D, E and W used in the preparation of the polymer P, the molar ratio of the monomers A:B being $\leq 10:1$.

13. The polymer P as claimed in claim 12, wherein the amount of the monomers A used is 30-70 mol %, that of B is 10-20 mol %, that of C is 10-20 mol %, that of D is 6-10 mol %, that of E is 0-7 mol % and that of W is 0-1 mol %, based in each case on the total molar amount of the monomers of A, B, C, D, E and W used in the preparation of the polymer P.

14. The polymer P as claimed in claim 13, wherein the amount of the monomers A used is 55-65 mol %, that of B is 12-18 mol %, that of C is 12-18 mol %, that of D is 7-9 mol %, that of E is 0.1-2 mol % and that of W is 0-0.1 mol %, based in each case on the total molar amount of the monomers of A, B, C, D, E and W used in the preparation of the polymer P.

15. A method of forming a composition by adding the polymer P as claimed in claim 1 as a plasticizer to hydraulically setting compositions.

16. A method of emulsifying a composition with the polymer P as claimed in claim 1.

17. A composition Z comprising at least one polymer P as claimed in claim 1 and at least one antifoam M.

18. The composition Z as claimed in claim 17, wherein the ratio of the polymer P to the antifoam M is from 2:3 to 49:1.

19. The composition Z as claimed in claim 17, wherein the antifoam M is a phosphoric acid ester, a polyalkylene glycol, a fatty acid, a fatty acid ester or a silicone.

20. The composition Z as claimed in claim 17, wherein the composition additionally contains water.

21. The composition Z as claimed in claim 20, wherein the composition additionally comprises at least one plasticizer V for hydraulically setting compositions.

22. The composition Z as claimed in claim 21, wherein the plasticizer V is a polycarboxylate.

23. An aqueous composition Z as claimed in claim 21, the composition Z comprises from 0.04 to 10% by weight of polymer P, from 0.01 to 10% by weight of antifoam M and from 3 to 50% by weight of plasticizer V, based on the weight of the aqueous composition Z.

* * * * *